US007082715B2

(12) United States Patent
De Winter (10) Patent No.: US 7,082,715 B2
(45) Date of Patent: Aug. 1, 2006

(54) WATERING DEVICE

(75) Inventor: Koen De Winter, Montreal (CA)

(73) Assignee: Drip-It Systems International Inc., Lachine (CA)

( * ) Notice: Subject to any disclaimer, the term of this patent is extended or adjusted under 35 U.S.C. 154(b) by 0 days.

(21) Appl. No.: 10/636,660

(22) Filed: Aug. 8, 2003

(65) Prior Publication Data

US 2004/0025428 A1 Feb. 12, 2004

Related U.S. Application Data

(60) Provisional application No. 60/402,082, filed on Aug. 9, 2002.

(51) Int. Cl.
*A01G 29/00* (2006.01)
*A01G 27/04* (2006.01)

(52) U.S. Cl. .............................. 47/48.5; 47/79; 47/81; 222/187; 239/44

(58) Field of Classification Search ............. 47/48.5, 47/79, 81, 82, 80; 222/78, 187, 650; 111/7.1–7.4; 239/276, 44, 52, 145, 326, 34, 273, 211; D23/213–215, 217; A01G 27/04
See application file for complete search history.

(56) References Cited

U.S. PATENT DOCUMENTS

| 689,248 | A | * | 12/1901 | Timm | 47/48.5 |
|---|---|---|---|---|---|
| 1,099,720 | A | * | 6/1914 | Peck | 239/40 |
| 2,375,860 | A | * | 5/1945 | Markham | 47/48.5 |
| 2,747,332 | A | * | 5/1956 | Morehouse | 47/81 |
| 4,115,951 | A | * | 9/1978 | Becker et al. | 47/81 |
| 4,970,823 | A | * | 11/1990 | Chen et al. | 47/48.5 |
| 5,443,544 | A | * | 8/1995 | Azoulay | 47/48.5 |
| 5,542,605 | A | * | 8/1996 | Campau | 239/44 |
| 5,896,700 | A | * | 4/1999 | McGough | 47/48.5 |
| 6,052,942 | A | * | 4/2000 | Chu | 47/48.5 |
| 6,112,456 | A | * | 9/2000 | Rummins | 47/48.5 |
| 6,128,856 | A | * | 10/2000 | Doan | 47/48.5 |
| 6,219,963 | B1 | * | 4/2001 | Wang | 47/48.5 |
| 6,243,986 | B1 | * | 6/2001 | Crowley | 47/48.5 |
| 2002/0020111 | A1 | * | 2/2002 | Rosenberg | 47/48.5 |

FOREIGN PATENT DOCUMENTS

| AU | 9341275 A | * | 6/1992 |
|---|---|---|---|
| EP | 0126574 | * | 11/1984 |
| EP | 1145623 | * | 4/2000 |
| FR | 2692433 A1 | * | 12/1993 |
| JP | 11285322 A | * | 4/1998 |
| JP | 2001045893 A | * | 9/1998 |
| JP | 2000295932 A | * | 10/2000 |
| WO | PCT/FR92/00780 | * | 3/1993 |

* cited by examiner

*Primary Examiner*—Andrea M. Valenti
(74) *Attorney, Agent, or Firm*—Protections Equinox Int'l; Franz Bonsang, Patent Agent (57) ABSTRACT

A plant watering device for use in a growing medium, which comprises a base with an open top liquid receiving section with a discharge inlet aperture located therein. A medium engaging section is connected to the base and has a discharge outlet aperture communicating with the inlet aperture. A contamination prevention member for preventing contamination of the dispensing aperture is located adjacent thereto. A container with a discharge spout has an amount of a liquid contained therein and is filled on the base. The discharge spout is positioned into the liquid receiving section. A wick component is mounted in the liquid receiving section to receive the liquid from the container and extends between the inlet aperture and the outlet aperture to automatically deliver the liquid to the outlet aperture and into the growth medium at a controlled rate.

27 Claims, 7 Drawing Sheets

WATERING DEVICE

CROSS-REFERENCE TO RELATED APPLICATION

This application claims priority from U.S. Provisional Application for Patent Ser. No. 60/402,082, filed on Aug. 9, 2002.

FIELD OF THE INVENTION

The present invention relates to the general field of horticultural accessories and is more particularly concerned with a plant watering device.

BACKGROUND OF THE INVENTION

There exists a plurality of situations wherein it is desirable to dispense a relatively constant volume of liquid, either continuously or at periodic time intervals. For example, typical applications requiring liquid to be dispensed in a controlled fashion include plant feeding or watering, fertilizing, pet watering, pet medicating, lubricating in general, humidifying and fumigating, air freshening, toilet bowl and drain cleaning, just to name a few.

Expanding on the plant feeding or watering example, it is well known that house plants are a popular way to create a pleasant and healthy environment. With current trends, such as cocooning and the increased awareness about the impacts of living environments on the health of individuals, plants of various sorts are being used increasingly in various situations and environments such as dwellings, work places and entertainment environments to beautify and enrich the appearance of the area.

It is also well known that moisture is essential to sustain plant life. In soil, moisture and oxygen are present generally in an inversely proportionate ratio. Accordingly, as the moisture content of the soil increases, the oxygen level decreases. An imbalance between oxygen and water reduces or may even stop photosynthesis. Hence, the maintenance of a proper moisture/oxygen balance optimizes the photosynthetic process for a given plant and, therefore, a plant's growths, assuming that other essential environmental factors are present.

If, for example, the percentage of soil moisture is reduced, the plant roots must expend additional energy in order to obtain moisture by osmosis. This, in turn, necessarily diminishes the energy that would otherwise be available for growth. A deprivation of oxygen by overwatering similarly reduces the growth process.

Plant roots develop randomly and omni-directionally, but survive in any direction only to the extent that moisture is immediately encountered and assimilable. When aridity is encountered, the most efficient finer root endings quickly atrophy. Accordingly, to achieve optimal growth, the majority of container plants require evenness of moisture with regard to both spatial distribution of the moisture and the mean moisture level overtime.

The conventional method of watering a house plant involves saturating the soil mass. Typically, most house plants will stay 100% moist for a few days after being saturated. Over the following days, the moisture level will most often remain intermediate before becoming semi-arid and then arid. Depending on the attentiveness of the plant owner, this arid condition may continue for a number of additional days, often causing residual damage. Thus, during a typical watering cycle, the plant usually experiences an optimal moisture/oxygen balance during only a small portion of the time.

Furthermore, it is often found that the entire root system is not exposed to an even distribution of moisture. Rather, it usually encounters a concentration of moisture in the lower region of the plant container. This diminishes the size of the root system upon which the remainder of the plant's growth depends.

Optimally, watering should be performed on a regular basis using the correct amount of water at appropriate intervals. This is often not the case. Also, if the plant caretaker is absent for any extended period of time, arrangements must be made for watering. The effort and exactness required for conventionally watering plants has been beyond the ability and focus of many who would otherwise enjoy the proximity and decorative value of plants.

Several methods and devices have been proposed for attempting to provide adequate watering in the absence of a plant caretaker. One of these methods involves moving the plants to a sink or other basin and sitting the latter in a shallow level of water in order to soak the roots continuously for the entire period of absence. This method is however harmful to plants requiring roots to dry out between waterings. Too much water can also lead to molds that can kill the plant. Furthermore, this method is impractical where the plants are either numerous and/or too big.

Relatively complex automatic systems using electro-mechanical timers for actuating a valve at preset intervals for a preset period of time are also known. It is also common to use systems having small apertures or restrictors for dripping water continuously onto the plant. Such systems are typically used in a nursery or a garden where plants are grouped closely together and water can be supplied from a pressurized source. Such systems, however, may prove to be impractical or undesirable for a typical home where plants are spread out or moved randomly. Furthermore, these types of systems are both relatively complex and expensive.

Gravity feeding from elevated reservoirs is sometimes used but this method also includes interconnecting various tubings and is therefore impractical for most watering requirements in an office or a home.

Another method for automatically watering plants involves the use of a wick. A container of water is positioned adjacent to or above the plant and a wetted wick is extended from the container to the plant. Capillary action draws water gradually from the container to the plant. This method, however, suffers from numerous drawbacks. Indeed, while it may provide for a generally continuous flow, the rate of flow varies with the level of water in the container. As the level drops, the flow rate slows accordingly. Furthermore, it is very difficult to customize the flow rate for a given application since the flow rate is directly proportional to the capillary action which, in turn, is directly proportional to the level of water in the feeding container.

Other drawbacks associated with prior automatic liquid dispensing systems using a capillary action include the poor reliability of such systems which are subject to malfunction due to clogging. Also, most prior art systems using capillary action are not well suited for providing irrigation to the plant using liquids having physical properties other than those of water such as liquid fertilizers, growth enhancers and the like.

Furthermore, some prior art systems do not allow for dispensing of liquids for extended periods of time using relatively small and aesthetically pleasing dispensing containers. Also, some prior art devices lend themselves to important water losses through evaporation and other types of water losses through poor design choices.

Still furthermore, some prior art devices suffer from being overly complex and from requiring relatively complex maneuvers on behalf of the intended user. Still furthermore, most prior art devices suffer from being unaesthetic and, hence, defeating the purpose of attempting to improve the overall appearance of an area by providing plants. Accordingly, there exists a need for an improved plant watering device.

SUMMARY OF THE INVENTION

Advantages of the present invention include the fact that the proposed plant watering device is capable of automatically supplying proper amounts of liquids into the soil of a flower pot for growing a plant. The proposed device allows for the dispensing of a relatively constant volume of liquid throughout a preset dispensing period. Also, the proposed device allows for the customization of the amount of liquid to be dispensed over a predetermined period of time.

Furthermore, the proposed device provides several horticultural advantages including a reduction in the watering frequency. Also, the elimination of overhead watering prevents pesticides and other useful products from being washed off the leaves of the plant increasing their effective half-life. Furthermore, the proposed method improves the retention of nutrients in the soil. Also, due to the inverted leaching, certain compounds such as salt which are harmful to the plant when concentrated near roots will steadily move out of the primary root zone as fresh water is dripped at specific locations in the reservoir. Still furthermore, the proposed type of watering creates a beneficial environment for the plant by increasing the humidity level around the plant's foliage.

The proposed watering device allows for water to be delivered at a predetermined rate and at specific predetermined locations in the soil. This allows the device to target specific moisturizing areas.

Also, the proposed device allows for dispensing of various types of liquids having different physical characteristics including water, fertilizers, growth enhancers and delayers and mixtures of such products with reduced risks of modifying the dispensing rate.

Furthermore, the proposed device is designed to reduce the risk of blockage or clogging of its dispensing components by having the latter contact the soil. Still furthermore, the proposed device is designed so as to be installable in a conventional flower pot in a stable manner.

Also, the proposed device is designed so as to allow an intended user to initiate the irrigation process through a set of quick, easy and ergonomical steps without requiring special tooling or manual dexterity.

Still furthermore, the proposed device is designed so as to reduce the risks of splashing and spillage of water during both installation and removal of the device into and from the flower pot and during other steps required for initiating and/or terminating the watering operation.

Also, the proposed device is specifically designed so as to provide an aesthetically pleasing visual appearance so as to reduce the risks of deterring the overall aesthetical aspect of the plant and its immediate environment. Still furthermore, the proposed device is designed so as to be manufactured using conventional forms of manufacturing so as to realize a watering system that will be economically feasible, long-lasting and relatively trouble-free in operation.

In accordance with an embodiment of the present invention, there is provided a plant watering device for insertion use in a growing medium, the device comprising: a base having an open top liquid receiving section with a discharge inlet aperture located therein; a medium engaging section for selective insertion into the growing medium connecting to the base and having a discharge outlet aperture in communication with the discharge inlet aperture; a contamination prevention means for preventing contamination of the discharge outlet aperture upon insertion of the medium engaging section into the crowing medium, the contamination prevention means being located adjacent the discharge outlet aperture; a container having a discharge spout, the container having an amount of a liquid contained therein, the container being fittingly mounted on the base, the discharge spout being positioned into the liquid receiving section; and at least one wick component mounted in the liquid receiving section to receive the liquid from the container and extending between the discharge inlet aperture and the discharge outlet aperture to automatically deliver the liquid to the discharge outlet aperture and into the growth medium at a controlled rate.

Conveniently, the medium engaging section includes at least one anchoring peg integral with the base and extending therefrom. The medium engaging section includes two radially spaced apart anchoring pegs integral with the base. Typically, each anchoring peg includes a discharge channel extending at least partially therealong and between the discharge inlet aperture and the discharge outlet aperture.

Conveniently, the base includes a peripheral sidewall and a base wall defining the open top liquid receiving section, the anchoring pegs being connected to diametrically opposed sections of the base wall and define a peg spacing therebetween, the anchoring pegs extending away therefrom. Typically, the anchoring pegs are generally tapered with a pointed distal tip.

Conveniently, the discharge outlet aperture is a dispensing slot extending at least partially along an inner surface of the anchoring pegs. Typically, the discharge outlet aperture is a disc-shaped dispensing aperture formed on an outer surface of the anchoring pegs.

Conveniently, the contamination prevention means includes a channel-forming section protruding inwardly from the inner surface of the anchoring peg and generally perpendicular to the longitudinal axis of the anchoring peg.

Conveniently, the channel-forming section, when the anchoring peg is inserted into the growing medium, creates a clearance between the dispensing aperture and a peripheral wall of the dispensing channel.

Typically, the dispensing aperture is formed on an inwardly tapered cut-out surface of the anchoring pegs.

Typically, a raking ledge is formed on each anchoring peg adjacent the dispensing aperture.

Typically, a peripheral flange is connected to an upper peripheral edge of the peripheral sidewall, the flange extending radially outwardly from the peripheral sidewall.

Typically, the liquid receiving section further includes a wick retaining member, for retaining the wick component in a predetermined spatial relationship relative to the dispensing inlet aperture and the dispensing channel, and a liquid blocking member for preventing the liquid contained in the liquid receiving section from flowing directly into the dispensing inlet aperture. The wick retaining member and the liquid blocking member both include a pair of inner wall complexes extending integrally from an inner surface of the peripheral sidewall and the base wall.

Typically, each inner wall complex further includes a pair of spaced apart and generally rectilinear wick abutment sections extending integrally and generally perpendicularly from the inner surface of the peripheral sidewall. The wick abutment sections extend into a generally U-shaped blocking segment and include a pair of blocking and abutment flanges, the wick abutment sections and the blocking segments substantially encircle the dispensing inlet aperture.

Conveniently, a centering component extends generally perpendicularly from the base wall. The centering component includes four centering blades arranged in a cross-shaped configuration and tapered into a pointed apex. Typically, the base wall further includes a plurality of recesses extending radially outwardly from the centering component.

Typically, the aforesaid device includes two wick components. Each wick component includes a generally elongate main segment, a pair of generally elongate auxiliary segments and a spacing segment, the main segment and the auxiliary segments extending in a generally parallel and spaced apart relationship relative to each other, the auxiliary segments being positioned laterally on opposite sides of the main segment and define a pair of segment clearance spacings therebetween, the auxiliary segments each having a distal tip.

Typically, the main segment extends through the dispensing inlet aperture into the dispensing channel, the auxiliary segments extending into the liquid receiving section, the distal tips being located adjacent the base wall. Typically, the wick components include at least one micro-channel formed therein. Typically, the wick component is made from a hydrophilic material. The hydrophilic material is cotton coated with a hydrophilic polymer.

Conveniently, the container includes a flat abutment segment to abuttingly rest against the peripheral flange of the peripheral sidewall. Typically, the discharge spout is generally cylindrical and sized and configured to be fittingly insertable over the centering component.

In accordance with an embodiment of the present invention, there is provided a plant watering device for insertion use in a growing medium, the device comprising: a base having an open top liquid receiving section with a discharge inlet aperture located therein; a medium engaging section for selective insertion into the growing medium connecting to the base and having a discharge outlet aperture in communication with the discharge inlet aperture; a contamination prevention means for preventing contamination of the discharge outlet aperture upon insertion of the medium engaging section into the growing medium, the contamination prevention means being located adjacent the discharge outlet aperture; a container having a discharge spout, the container having an amount of a liquid contained therein, the container being fittingly mounted on the base, the discharge spout being positioned into the liquid receiving section; and at least one wick component mounted in the liquid receiving section to receive the liquid from the container and extending through the discharge inlet aperture to the discharge outlet aperture to automatically deliver the liquid thereto and into the growth medium at a controlled rate from the liquid receiving section through the discharge inkjet aperture, the liquid receiving section including a wick retaining member, for retaining the wick component in a predetermined spatial relationship relative to the discharge inlet aperture, and a liquid blocking member for preventing the liquid contained in the liquid receiving section from flowing directly into the discharge inlet aperture while allowing the wick component to extend therethrough, both the wick retaining member and the liquid blocking member extending integrally from an inner surface of a peripheral sidewall and a base wall defining the open top liquid receiving section.

BRIEF DESCRIPTION OF THE DRAWINGS

Embodiments of the present invention will now be disclosed, by way of example, in reference to the following drawings in which.

DETAILED DESCRIPTION OF THE PREFERRED EMBODIMENTS

Figure 10:
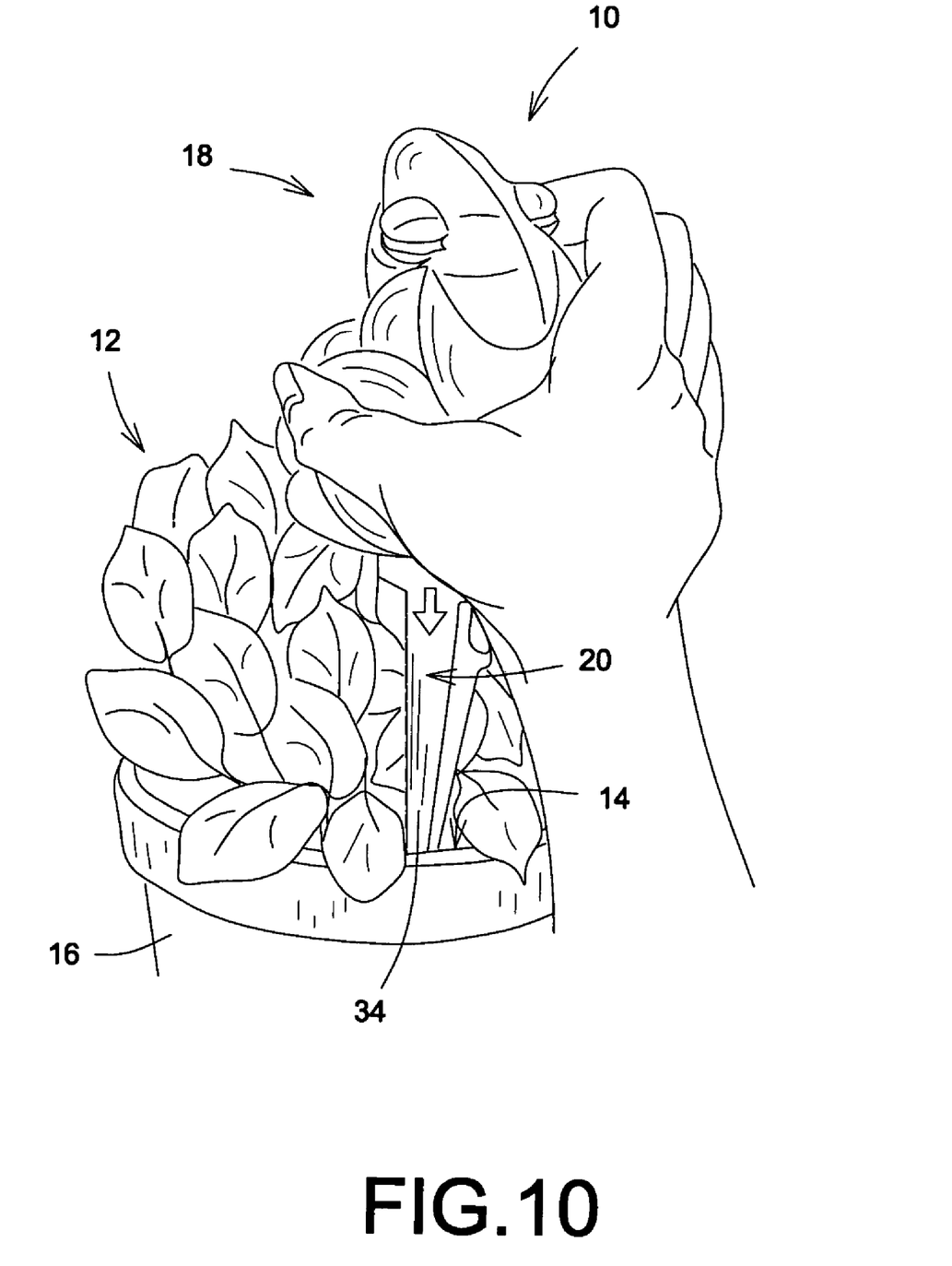
FIG. 10, in a partial perspective view, illustrates a watering device in accordance with an embodiment of the present invention being anchored into the soil of a conventional plant container.

Referring to FIG. 10, there is shown a plant watering device 10, in accordance with an embodiment of the present invention. The plant watering device 10 is shown about to be used for watering a plant 12 growing in a growing medium 14 contained within a conventional flower pot or container 16. Although the device 10 is shown as being used with a conventional frustro-conical plant container 16, and with a specific variety of plant 12, it should be understood that the device 10 could be used with any suitable plant container for any suitable type of plant without departing from the scope of the present invention.

Also, the term "growing medium" should be construed as any suitable growing material such as soil, earth, earth mixed with peat moss, fertilizers or other growth enhancing products, or any suitable material without departing from the scope of the present invention. The device 10 is used for providing a suitable liquid to the root system of the plant 12. Again, the term "liquid" should be construed as including water, liquid fertilizers, liquid nutrients, liquid growth regulators and enhancers, a mixture of the above or any other suitable liquid without departing from the scope of the present invention.

Furthermore, although the present invention is exemplified as being used specifically in a context of plant watering, it should be understood that some or all of the characteristics of the present invention could be used in other liquid dispensing situations including pet watering, medicating, humidifying and fumigating, toilet bowl and drain cleaning, air freshening, fertilizing and like without departing from the scope of the present invention.

Figure 1:
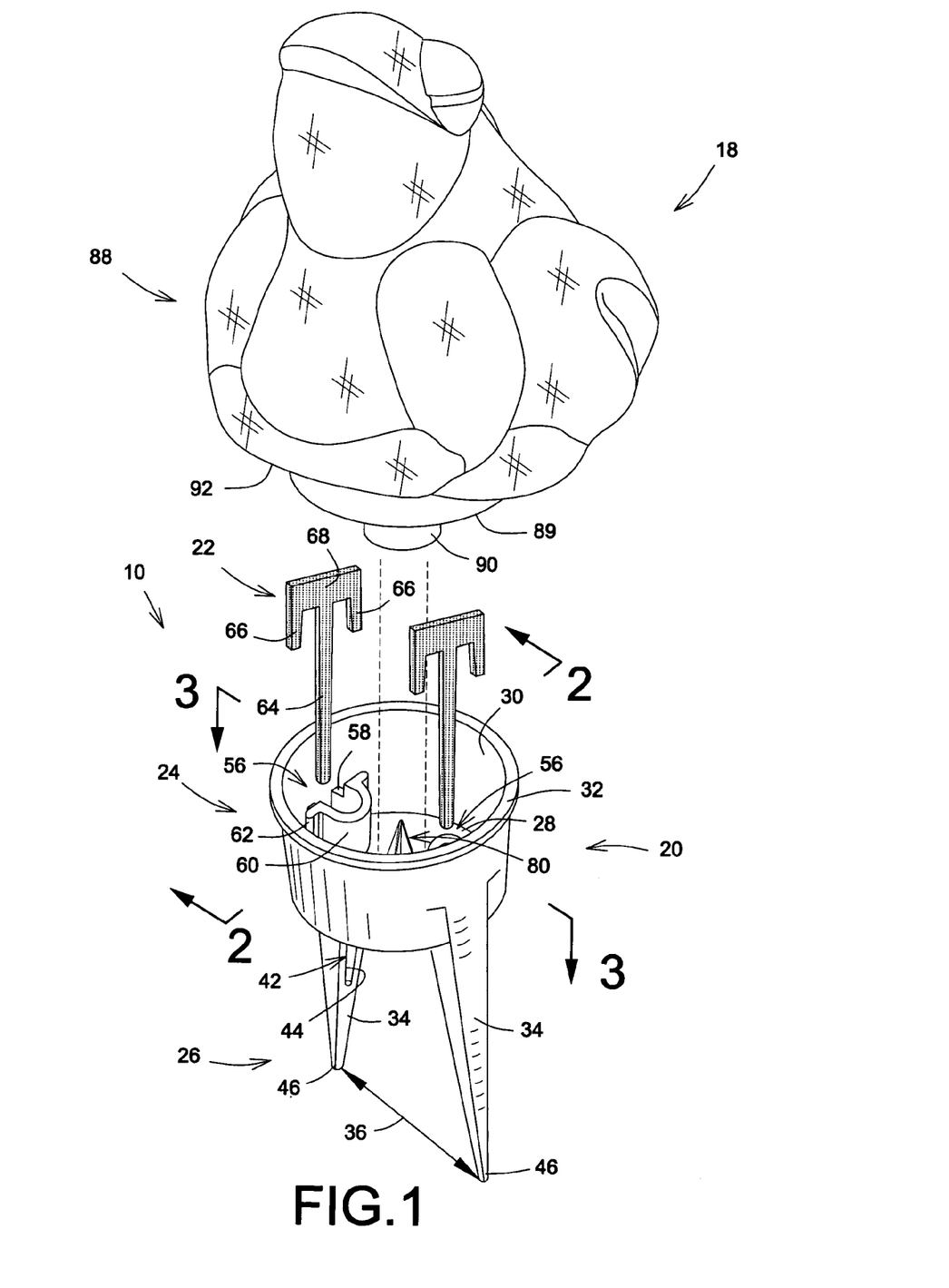
FIG. 1, in an exploded view, illustrates a plant watering device in accordance with an embodiment of the present invention.
Figure 2:
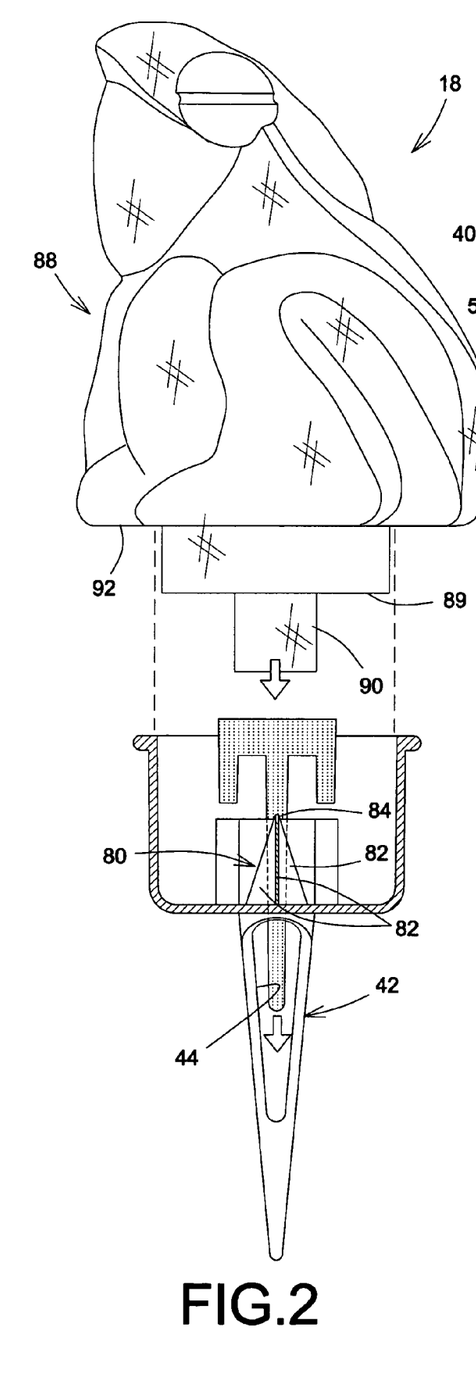
FIG. 2, in a partial cross-sectional view with sections taken-out taken along arrows 2—2 of FIG. 1, illustrates a plant watering device in accordance with an embodiment of the present invention.
Figure 3:
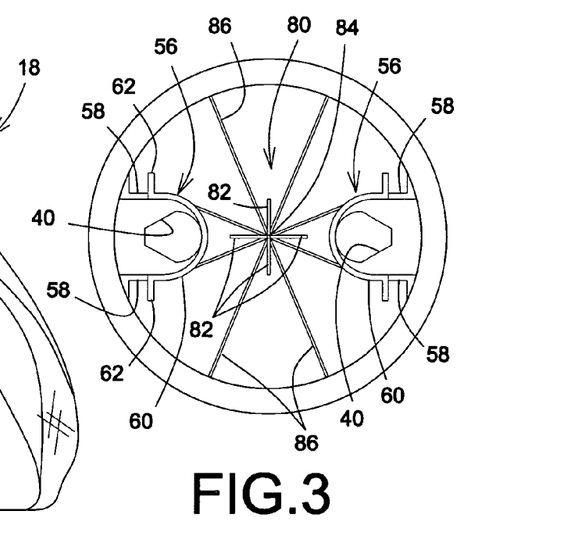
FIG. 3, in a top view illustrates the configuration of some features of a base component part of a plant watering device in accordance with an embodiment of the present invention.

Referring now more specifically to FIG. 1, there is shown that the device 10 generally includes a container component 18 for containing the liquid to be dispensed. The device 10 also includes a base component 20 for anchoring the device 10 into the growing medium 14 and for delivering the liquid to at least one specific location within the growing medium 14. The device 10 further includes at least one and preferably two wick components 22 for regulating the dispensing flow.

More specifically, the base component 20 typically includes a liquid receiving section 24 and a growth medium engaging section 26. The liquid receiving section 24 typically defines an open-top receptacle having a receptacle base wall 28 and a receptacle peripheral wall or sidewall 30.

The receptacle peripheral sidewall 30 is typically provided with a peripheral wall flange 32 extending generally radially and outwardly from an upper peripheral edge thereof. It should be understood that although the liquid-receiving section 24 is illustrated throughout the figures as having a generally cylindrical configuration, it could have other open-top configurations without departing from the scope of the present invention.

The ground engaging section 26 includes at least one, and preferably two anchoring pegs 34 extending from the liquid-receiving section 24 in a direction leading generally away from the receptacle base wall 28. Preferably, the anchoring pegs 34 extend generally integrally from generally diametrically opposed sections of the receptacle peripheral wall 30 so as to define a peg spacing 36 therebetween.

The peg spacing 36 is intended to improve stability of the anchorage provided by the anchoring pegs 34. Furthermore, the anchoring pegs 34 may optionally diverge away from each other in a direction leading away from the liquid-receiving section 24.

Each anchoring peg 34 is provided with a dispensing or discharge channel 38 extending at least partially therealong between a corresponding dispensing inlet aperture 40 formed in the receptacle base wall 28 and a corresponding dispensing or discharge outlet 42 formed in the anchoring peg 34 typically intermediate its longitudinal ends.

In one embodiment of the invention shown in FIGS. 1 through 3, 5 and 7 through 10, the dispensing outlet 42 includes a dispensing slot 44 extending at least partially along an inner surface of each anchoring peg 34. In an alternative embodiment of the invention shown in FIGS. 4 and 6, the dispensing outlet 42 includes a generally disc-shaped dispensing aperture 44' formed on an outer surface of each anchoring peg 34.

It should be understood that the dispensing outlet 42 could take any suitable configuration and could be positioned anywhere along either one or both of the anchoring pegs 34 without departing from the scope of the present invention.

Each anchoring peg 34 preferably has a generally tapering configuration in a direction leading away from the liquid-receiving section 24. Each anchoring peg 34 hence typically defines a generally pointed distal tip 46. The tapering configuration defining a generally pointed tip is adapted to facilitate insertion of the anchoring pegs 34 into the growing medium 14.

Figure 4:
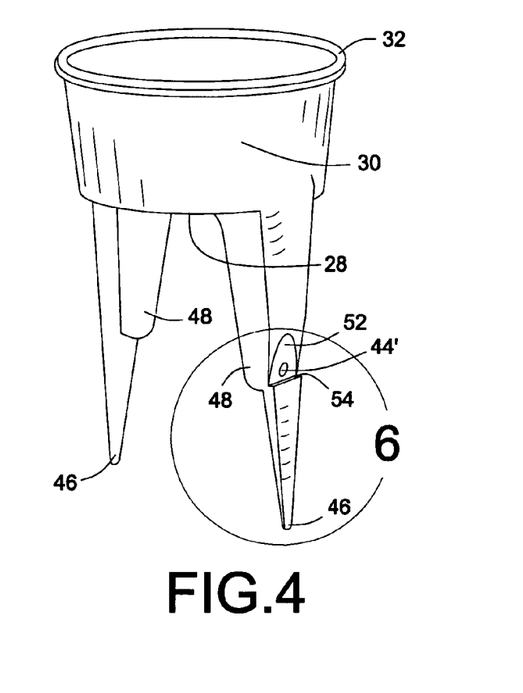
FIG. 4, in a perspective view illustrates an alternative embodiment of a base component part of a plant watering device in accordance with an embodiment of the present invention.
Figures 5, 6:
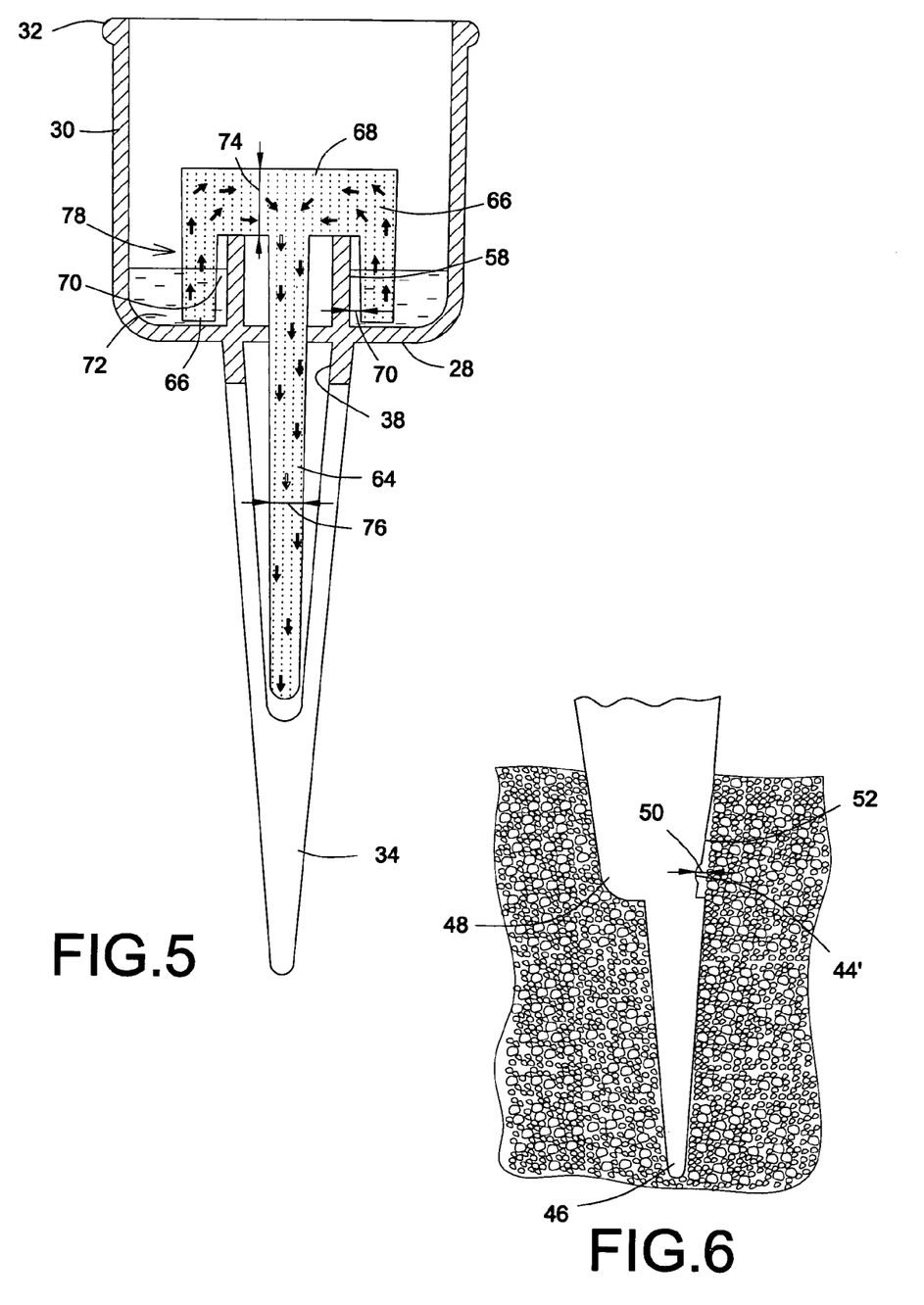
FIG. 5, in a longitudinal cross-sectional view illustrates some of the features of the internal configuration of a base component part of a watering device in accordance with an embodiment of the present invention.
FIG. 6, in a partial cross-sectional view illustrates a portion of an anchoring peg included in base component part of a plant watering device in accordance with an embodiment of the present invention, the section of anchoring peg being inserted into a growing medium contained within a conventional flower pot.

In the embodiment of the invention shown in FIGS. 4 and 6, each anchoring peg 34 is preferably provided with a contamination-prevention means for preventing contamination of the dispensing aperture 44' by the growing medium once the corresponding anchoring peg 34 is inserted therein. Typically, the contamination-preventing means includes a channel-forming section 48 protruding inwardly from the inner surface of the corresponding anchoring legs 34 in a direction generally perpendicular to the longitudinal axis of the corresponding anchoring pegs 34.

The channel-forming section 48 is intended to compact the growing medium 14 located immediately adjacent to the dispensing aperture 44' when the anchoring pegs 34 are being inserted into the growing medium 14. By compacting the growing medium 14, the channel-forming section 48 creates a clearance 50 between the dispensing aperture 44' and the peripheral wall of the adjacent channel so as to reduce the risks of having the growing medium 14 clog or otherwise block the dispensing aperture 44'. The clearance 50 also prevents growing medium positioned adjacent the dispensing aperture 44' from generating a counter-effective capillary action in the channel 38.

The clearance or spacing 50 is further increased by forming the dispensing aperture 44' on an inwardly tapered cut-out surface 52 of the anchoring pegs 34. Furthermore, a raking ledge 54 is formed on each anchoring peg 34 adjacent the dispensing aperture 44' so as to further reduce the risks of having growing medium penetrate into or be in the immediate vicinity of the dispensing aperture 44'.

The liquid receiving section 24 is further provided with a wick-retaining member for retaining the wick component 22 in a predetermined spatial relationship relative to the dispensing inlet aperture 40 and corresponding dispensing or discharge channel 38. The liquid-receiving section 24 is still further typically provided with a liquid-blocking member formed therein for preventing liquid contained within the liquid-receiving section 24 from flowing directly into the dispensing inlet aperture 40. The wick component 22 extends between the liquid receiving section 24 and the discharge channel 38.

Typically, both the wick-retaining member and the liquid-blocking member include a pair or generally similar inner wall complexes 56, both extending integrally from the inner surfaces of the receptacle peripheral and base walls 30, 28. Each inner wall complex 56 typically includes a pair or spaced-apart and generally rectilinear wick abutment sections 58 extending integrally in substantially perpendicularly from the inner surface of the receptacle peripheral wall 30.

The wick-abutment sections 58 extend integrally into a generally U-shaped blocking segment 60. A pair of blocking and abutment flanges 62 extend outwardly and generally perpendicularly at the intersection of the wick-abutment and blocking segments 58, 60. The wick-abutment and blocking segments 58, 60 are adapted to substantially encircle the dispensing inlet aperture 40 so as to prevent liquid contained within the liquid-receiving section 24 from flowing directly thereinto.

As illustrated more specifically in FIG. 5, each wick component 22 typically has a generally T-shaped configuration defining a generally elongated main segment 64, a pair of generally elongated auxiliary segments 66 and a wick spacing segment 68 extending therebetween. The main and auxiliary segments 64, 66 typically extend in a generally parallel and spaced-apart relationship relative to each other with the auxiliary segments 66 positioned laterally on opposite sides of the main segment 64 so as to define a pair of segment clearance spacings 70 therebetween.

The main, auxiliary and spacing segments 64, 66, and 68 are configured and sized so that when the wick component 22 is in its operational configuration shown in FIG. 5, the main segment 64 extends through the dispensing inlet aperture 40 into the dispensing channel 38 with the auxiliary segments 66 extending into the liquid-receiving section 24 with their distal tip generally adjacent the receptacle base wall 30.

The wick component 22 is secured into its operational configuration by having the wick clearance spacings 70 overriding the wick abutment sections 58 and the auxiliary segments 66 sandwiched between the inner surface of the receptacle peripheral wall 30 and an opposed surface of the blocking and abutment flanges 62.

Typically, both the blocking segments 60 and the blocking and abutment flanges 62 extend from the receptacle base wall 28 to a position substantially in register with the upper peripheral edge of the spacing segments 68 when the wick component 22 is in its operational configuration. Hence, each combination of a wick component 22, a corresponding blocking segment 60 and a corresponding blocking and abutment flanges 62 form a blocking structure for preventing water from flowing directly into the dispensing inlet aperture 40. The height of the blocking structure prevents water from being drawn into the dispensing inlet aperture 40 even when the liquid-receiving section 24 is substantially tilted.

The wick component 22 is typically manufactured so as to form micro-channels therein, typically at least one micro-channel. Typically, each wick component 22 is formed using a hydrophilic material such as a suitable thermoplastic polymeric resin in powderous form blown into a mold. The mold is heated to a suitable temperature so as to allow for the powderous polymeric resin to agglomerate and to form channels. As opposed to expanded or spongious polymeric components, the wick components 22 preferably form a limited number and ideally no closed cells. The micro-channels are adapted to facilitate both capillary and gravitational flow of liquid therein. In at least one embodiment of the invention, the wick components 22 are made out of cotton coated with an hydrophilic polymeric material such as nylon.

As illustrated more specifically in FIG. 5, once the auxiliary segments 66 are dipped into a liquid 72 contained within the receptacle 24, the micro-channels of the wick component 22 are able to draw the liquid 72 upwardly by capillarity from the tip of the auxiliary segments 66 towards the spacing segments 68. As is well known, the capillary action is a phenomenon caused by the adhesion of the liquid molecules to a given surface due to surface tension. Hence, the micro-channels are typically calibrated so as to optimize the capillary action.

Once the liquid 72 has reached the spacing segment 68, the liquid 72 drops into the main segment 64 through the action of gravity. Each wick component 22 is configured and sized so as to provide a customized flow rate flowing thereacross between the auxiliary and main segments 66, 64. In at least one embodiment of the invention, in order to prevent adhesion forces and other phenomenon from restricting the flow of liquid 72 in the main segment 64, the intermediate segment 68 has an intermediate segment width 74 greater than the main segment width 76 and the auxiliary segment width 78. This allows for accumulation of fluid into the spacing segments 68, increasing the hydrostatic pressure of the liquid in the wick main segment 64, and, hence, the gravitational pressure favoring the downward flow in the main channel 64.

Optionally, each wick component 22 could be configured and sized for providing a given flow rate customized for given watering parameters such as the type of plant, the relative humidity of the growing environment and so forth. Also, optionally, each wick component 22 could be embedded with a releasable physical agents such as fertilizers or the like adapted to be released at a predetermined rate by the wick component 22 mixed with the liquid as the latter flows therethrough.

Each liquid receiving section 24 is preferably further provided with a centering component 80 extending generally perpendicularly relative to the receptacle base wall 28 in a substantially central relationship relative thereto. The centering component 80 typically includes at least one and preferably four centering blades 82 having a generally cross-shaped configuration and tapering into a generally pointed apex 84.

The centering component 80 is intended to facilitate centering of the container component 18 when the latter is mounted to the liquid-receiving section 24. Also, the centering component 80, with its tapering configuration, is intended to gradually break the surface tension at the air-liquid interface of the water contained in the container component 18 when the latter is tilted thereover. This, in turn, is intended to prevent or reduce the risks of spillage of the content of the container component 18 when the latter is attached to the base component 20.

The receptacle base wall 28 is preferably provided with recesses 86 formed therein for providing an interrupted surface so as to reduce the risks of creating a surface tension vacuum when the container and base components 18, 20 are assembled. The recesses 86 are also adapted to facilitate the flow of the liquid within the receptacle liquid-receiving section 24 towards the auxiliary segments 66. The recesses 86 typically form a generally radial pattern which extends from the centering component 80, as illustrated more specifically in FIG. 3.

Referring now more specifically to FIGS. 1, 2 and 8 through 10, there is shown in greater details some of the features of the container component 18. The container component 18 defines a liquid containing section or enclosure 88 for containing a suitable amount of liquid. The liquid-containing section 88 extends into a stabilizing flange 89 leading to a discharge or dispensing spout 90. The stabilizing flange 89 typically has a disc-shaped configuration and is configured in size so as to be generally fittingly insertable into the open top of the liquid-receiving section 24.

The liquid-receiving section 88 typically defines a generally flat abutment segment 92 for being abuttingly rested or seated against the upper surface of the receptacle flange 32. The spout 90 typically has a generally cylindrical configuration and is typically configured in size so as to be substantially fittingly insertable over the centering component 80.

The liquid containing section 88 may take any suitable configuration. In the embodiments shown throughout the figures, the liquid-containing section 88 is formed out of a generally transparent or translucent and colored material and has the general configuration of a stylized frog. It should be understood that the liquid-receiving section 88 could have any suitable configurations without departing from the scope of the present invention. Typically, the liquid-receiving section 88 has an aesthetically pleasing appearance and is designed so as to be handled ergonomically.

Figure 7:
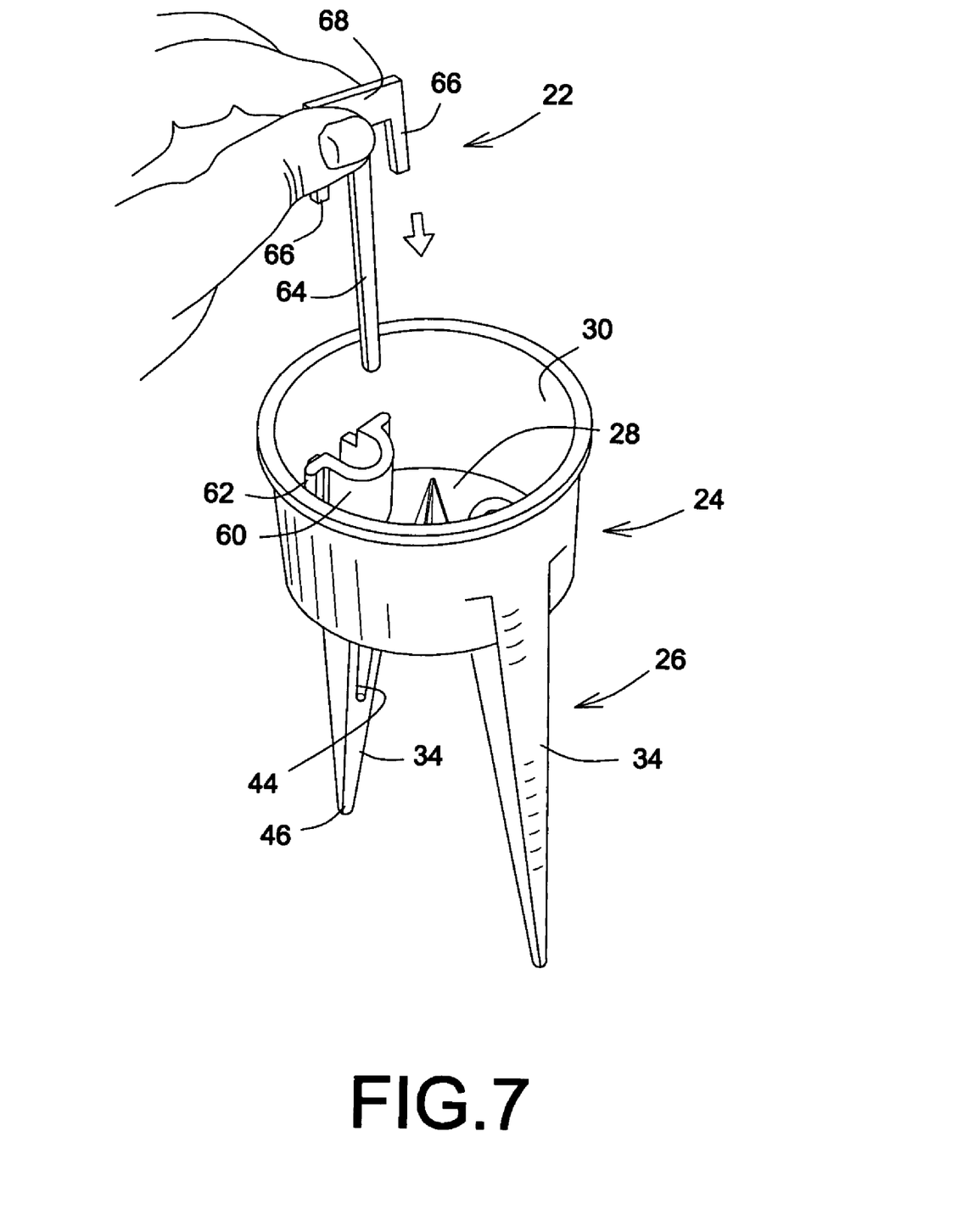
FIG. 7, in a partial perspective view with sections taken out, illustrates a wick component about to be installed within a base component, both the wick and base component being part of a watering device in accordance with an embodiment of the present invention.

In use, as illustrated in FIG. 7, each wick component 22 is initially installed ergonomically into its operational configuration by grasping the spacing segments 68 and sliding the wick component 22 towards the inner wall complex 56. The auxiliary segments 66 are inserted between the blade and abutment flanges 62 and the inner surface of the receptacle peripheral wall 30. The main segment 64 is inserted into the dispensing channel 38.

Figure 8:
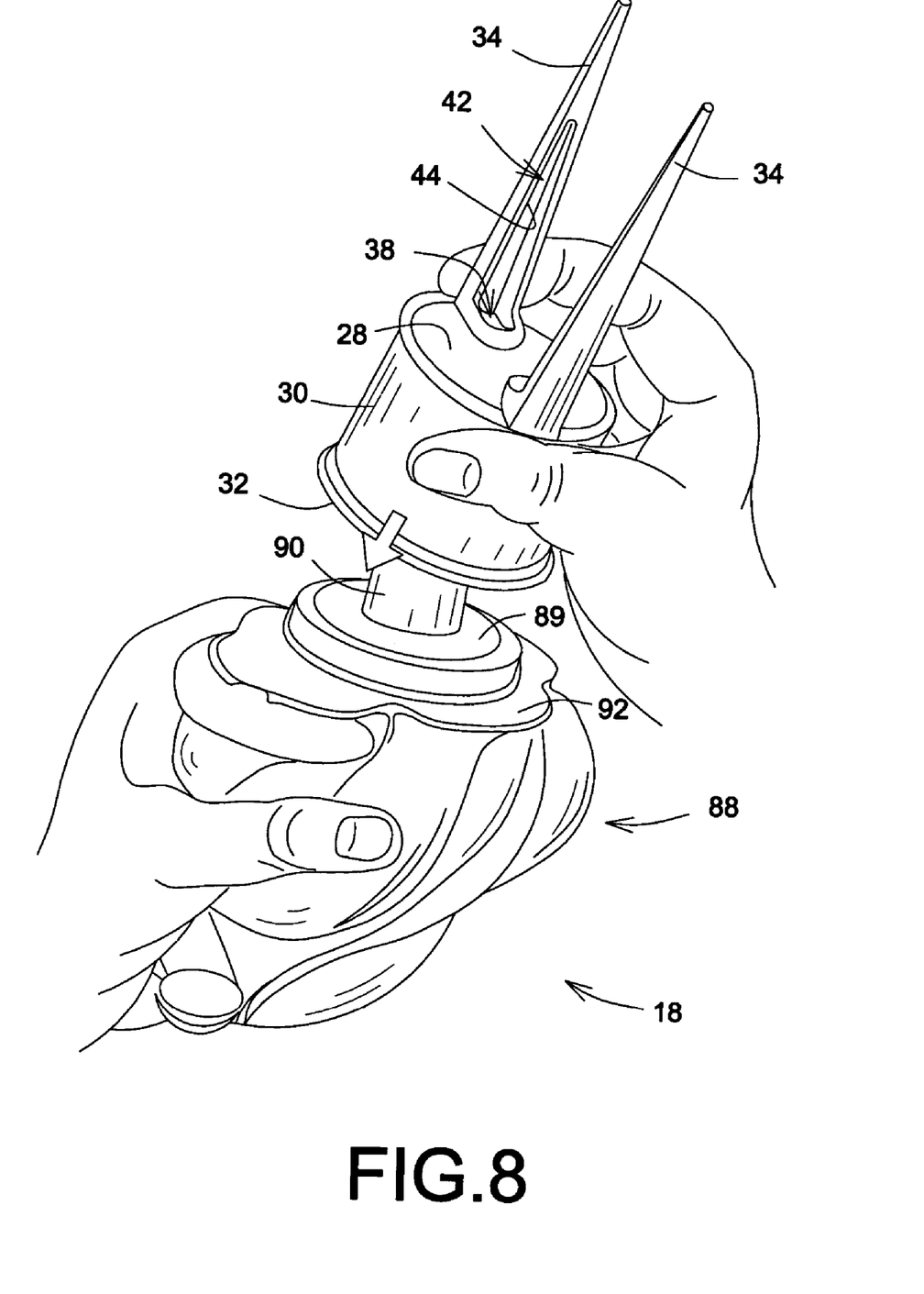
FIG. 8, in a perspective view with sections taken out, illustrates a container component part of a watering device in accordance an embodiment of the present invention, the container component being shown in an inverted configuration and being filled with water flowing from a water faucet.
Figure 9:
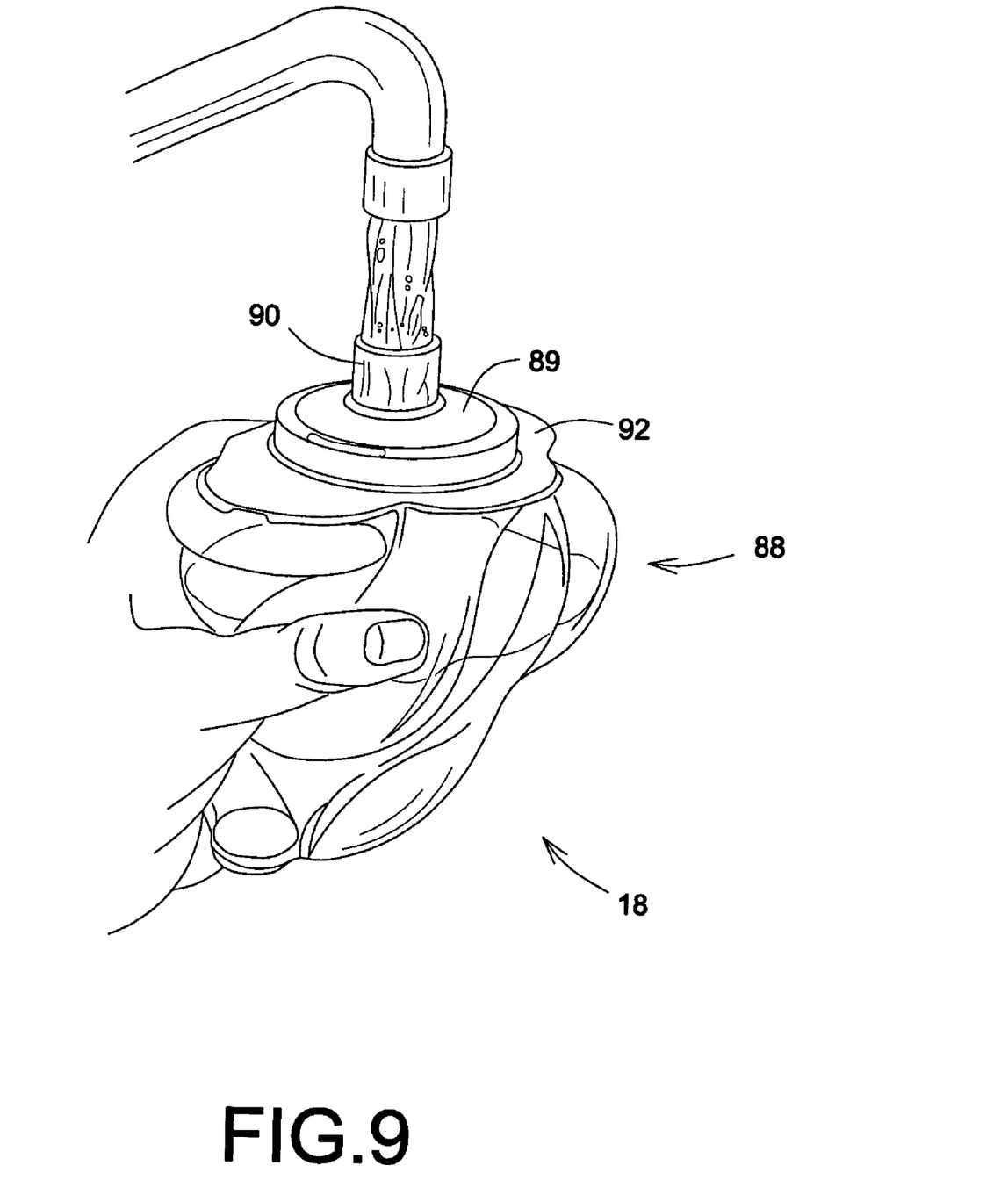
FIG. 9, in a partial perspective view with sections taken out, illustrates a base component being attached to a container component, both the base and container components being shown in an inverted configuration and being part of a watering device in accordance with an embodiment of the present invention.

As illustrated in FIGS. 8 and 9, the container component 18 is then filled with a liquid such as water. Again, the configuration of the liquid-containing section 88 facilitates ergonomical handling of the container component 18 such as for centering the spout 90 under a conventional faucet 94. The base component 20 is then mounted over the inverted container component 18 with the centering component 80 penetrating the channel formed by the spout 90, to attain a discharge configuration.

As illustrated in FIG. 10, once the base and container components 20, 18 are assembled together, the device 10 is anchored into the growing medium 14 by having the anchoring pegs 34 penetrate the growing medium 14 at a predetermined suitable location. Typically, the liquid being enclosed within the device 10, evaporation of the liquid is reduced and the container component 18, together with the wick component 22 are calibrated so that the device 10 will dispense approximately 500 ml over a period of a week. It should be understood that the device 10 could dispense any other suitable amount of liquid at any suitable rate without departing from the scope of the present invention.

I claim:

1. A plant watering device for insertion use in a growing medium, the device comprising:
    a base having an open top liquid receiving section with a discharge inlet aperture located therein;
    a medium engaging section for selective insertion into the growing medium connecting to the base and having a discharge outlet aperture in communication with the discharge inlet aperture;
    a contamination prevention means for preventing contamination of the discharge outlet aperture upon insertion of the medium engaging section into the growing medium, the contamination prevention means being located adjacent the discharge outlet aperture;
    a container having a discharge spout, the container having an amount of a liquid contained therein, the container being fittingly mounted on the base, the discharge spout being positioned into the liquid receiving section; and
    at least one wick component mounted in the liquid receiving section to receive the liquid from the container and extending through the discharge inlet aperture to the discharge outlet aperture to automatically deliver the liquid thereto and into the growth medium at a controlled rate from the liquid receiving section through the discharge inlet aperture,
    the liquid receiving section including a wick retaining member, for retaining the wick component in a predetermined spatial relationship relative to the discharge inlet aperture, and a liquid blocking member for preventing the liquid contained the liquid receiving section from flowing directly into the discharge inlet aperture while allowing the wick component to extend therethrough, both the wick retaining member and the liquid blocking member extending integrally from an inner surface of peripheral sidewall and a base wall defining the open top liquid receiving section.

2. The device, according to claim 1, in which the medium engaging section includes at least one anchoring peg integral with the base and extending therefrom.

3. The device, according to claim 2, in which the medium engaging section includes two radially spaced apart anchoring pegs integral with the base.

4. The device, according to claim 3, in which each anchoring peg includes a discharge channel extending at least partially therealong and between the discharge inlet aperture and the discharge outlet aperture.

5. The device, according to claim 4, in which the anchoring pegs are connected to diametrically opposed sections of the base wall and define a peg spacing therebetween, the anchoring pegs extending away therefrom.

6. The device, according to claim 5, in which the anchoring pegs are generally tapered with a pointed distal tip.

7. The device, according to claim 6, in which the discharge outlet aperture is a dispensing slat extending at least partially along an inner surface of the anchoring pegs.

8. The device, according to claim 7, in which the discharge outlet aperture is a disc-shaped dispensing aperture formed on an outer surface of the anchoring pegs.

9. The device, according to claim 8, in which the contamination prevention means includes a channel-forming section protruding inwardly from the inner surface of the anchoring peg and generally perpendicular to the longitudinal axis of the anchoring peg.

10. The device, according to claim 9, in which the channel-forming section, when the anchoring peg is inserted into the growing medium, creates a clearance between the dispensing aperture and a peripheral wall of the dispensing channel.

11. The device, according to claim 10, in which the dispensing aperture is formed on an inwardly tapered cut-out surface of the anchoring pegs.

12. The device, according to claim 11, in which a raking ledge is formed on each anchoring peg adjacent the dispensing aperture.

13. The device, according to claim 12, in which a peripheral flange is connected to an upper peripheral edge of the peripheral sidewall, the flange extending radially outwardly from the peripheral sidewall.

14. The device, according to claim 13, in which the wick retaining member and the liquid blocking member both include a pair of inner wall complexes extending integrally from an inner surface of the peripheral sidewall and the base wall.

15. The device, according to claim 14, in which each inner wall complex further includes a pair of spaced apart and generally rectilinear wick abutment sections extending integrally and generally perpendicularly from the inner surface of the peripheral sidewall.

16. The device, according to claim 15, in which the wick abutment sections extend into a generally U-shaped blocking segment and include a pair of blocking and abutment flanges, the wick abutment sections and the blocking segments substantially encircle the dispensing inlet aperture.

17. The device, according to claim 16, in which a centering component extends generally perpendicularly from the base wall.

18. The device, according to claim 17, in which the centering component includes four centering blades arranged in a cross-shaped configuration and tapered into a pointed apex.

19. The device, according to claim 18, in which the base wall further includes a plurality of recesses extending radially outwardly from the centering component.

20. The device, according to claim 19, further including two wick components.

21. The device, according to claim 20, in which each wick component includes a generally elongate main segment, a pair of generally elongate auxiliary segments and a spacing segment, the main segment and the auxiliary segments extending in a generally parallel and spaced apart relationship relative to each other, the auxiliary segments being positioned laterally on opposite sides of the main segment and define a pair of segment clearance spacings therebetween, the auxiliary segments each having a distal tip.

22. The device, according to claim 21, in which the main segment extends through the discharge inlet aperture into the dispensing channel, the auxiliary segments extending into the liquid receiving section, the distal tips being located adjacent the base wall.

23. The device, according to claim 22, in which the wick components include at least one micro-channel formed therein.

24. The device, according to claim 23, in which the wick component is made from a hydrophilic material.

25. The device, according to claim 24, in which the hydrophilic material is cotton coated with a hydrophilic polymer.

26. The device, according to claim 25, in which the container includes a flat abutment segment to abuttingly rest against the peripheral flange of the peripheral sidewall.

27. The device, according to claim 26, in which the discharge spout is generally cylindrical and sized and configured to be fittingly insertable over the centering component.

* * * * *